United States Patent [19]

Dingfors et al.

[11] Patent Number: 4,902,311
[45] Date of Patent: Feb. 20, 1990

[54] AIR PURIFICATION PROCESS

[75] Inventors: Kent Dingfors, Upplands Väsby; Christer Heinegård, Karlskoga; Sven Nilsson, Deje, all of Sweden

[73] Assignee: Nobel Chematur AB, Karlskoga, Sweden

[21] Appl. No.: 256,955

[22] Filed: Oct. 13, 1988

[30] Foreign Application Priority Data

Oct. 14, 1987 [SE] Sweden ................. 8704005

[51] Int. Cl.⁴ ............................. B01D 53/12
[52] U.S. Cl. ............................. 55/60; 55/74; 55/77; 55/181; 55/208; 55/269; 55/390
[58] Field of Search ............ 55/34, 60, 74, 77, 79, 55/181, 390, 208, 267–269

[56] References Cited

U.S. PATENT DOCUMENTS

| | | | |
|---|---|---|---|
| 3,686,827 | 8/1972 | Haigh et al. | 55/74 |
| 3,716,969 | 2/1973 | Maeda | 55/390 |
| 3,727,379 | 4/1973 | Bijleveld et al. | 55/74 X |
| 3,798,876 | 3/1974 | Kennedy | 55/74 X |
| 3,805,493 | 4/1974 | Kennedy et al. | 55/74 |
| 4,046,530 | 9/1977 | Izumo et al. | 55/181 |
| 4,231,764 | 11/1980 | Mattia | 55/79 X |
| 4,239,508 | 12/1980 | Rock et al. | 55/74 X |
| 4,257,783 | 3/1981 | Gutjahr et al. | 55/181 X |
| 4,259,094 | 3/1981 | Nagai et al. | 55/181 |

FOREIGN PATENT DOCUMENTS

| | | | |
|---|---|---|---|
| 2707065 | 9/1977 | Fed. Rep. of Germany | 55/77 |
| 52-043777 | 4/1977 | Japan | 55/77 |
| 53-035681 | 4/1978 | Japan | 55/181 |
| 54-011074 | 1/1979 | Japan | 55/181 |

Primary Examiner—Robert Spitzer
Attorney, Agent, or Firm—Sughrue, Mion, Zinn, Macpeak & Seas

[57] ABSTRACT

The present invention relates to a method and an apparatus for removing and recovering organic substances, primarily solvents, from industrial ventilation air contaminated with such substances. The invention is based on the adsorption of solvent in an adsorbent comprising macroporous polymeric particles upon passage of the air through a movable, so-called fluidized bed (2, 3) of the polymeric particles. These particles are fed continuously through the bed under the influence of the air and are then fed continuously into a desorption column (8), in which the solvent is desorbed from the adsorbent, stripped with the aid of heated air and drawn off to a cooler (14).

7 Claims, 4 Drawing Sheets

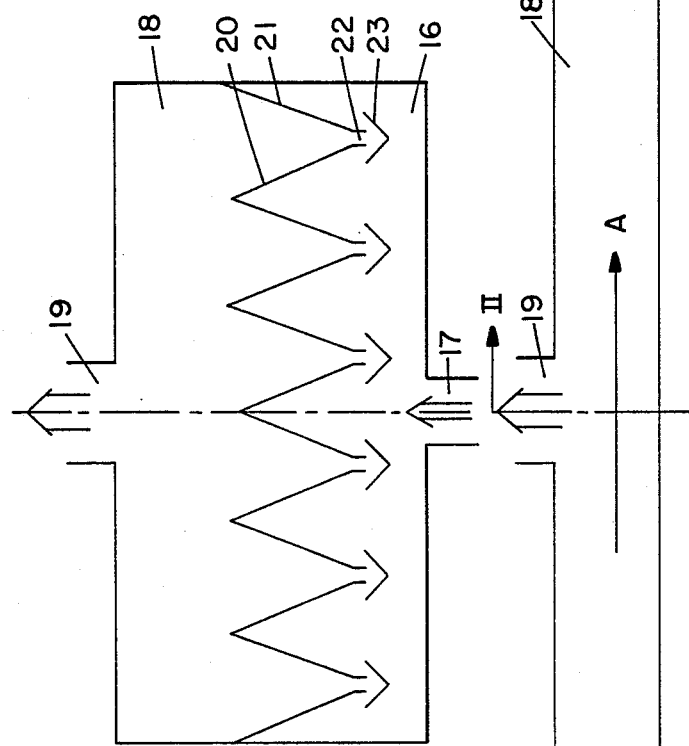
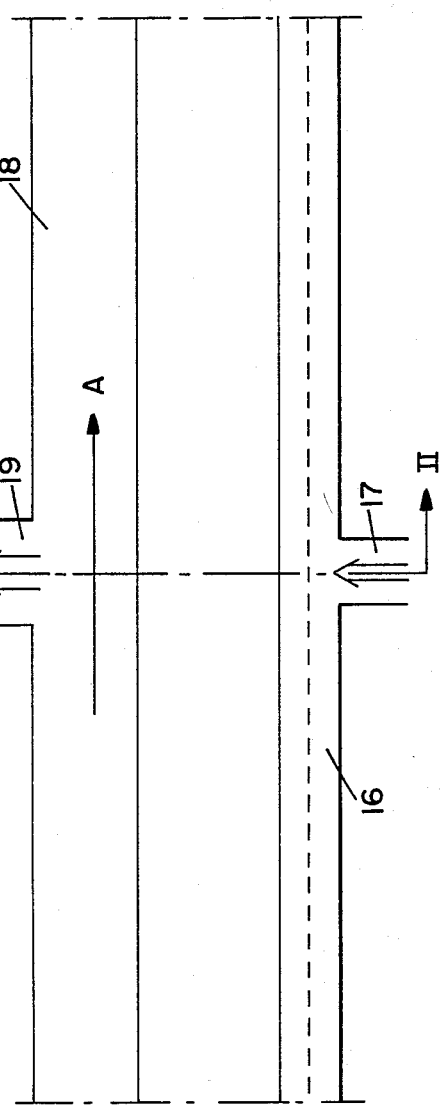
FIG. 2
FIG. 3

AIR PURIFICATION PROCESS

BACKGROUND OF THE INVENTION

The present invention relates to a method of removing and recovering organic substances, primarily solvents, from industrial ventilation air contaminated with such substances. The invention is based on the adsorption of solvent on an adsorbent comprising macroporous polymeric particles upon passage of the air through a movable, so-called fluidized bed of the polymeric particles. These particles are fed continuously through the bed under the influence of the air, at right angles to the direction of air flow. The polymeric particles are then fed continuously into a desorption column, in which the solvent is desorbed from the adsorbent, stripped with the aid of air and drawn off to a cooler, in which the solvent is condensed. The polymeric particles are fed continuously from the desorption column through a cooler and back to the adsorption bed. The invention also relates to apparatus for carrying out the method.

The invention can be said to be primarily characterized by a combination of the choice of adsorption agent and the configuration of the process. As will be seen from the following description, this combination affords unique possibilities of purifying industrial ventilation air.

When cleansing a gaseous mixture from organic substances, the adsorption agent used is normally active carbon. Active carbon, however, has a number of serious limitations, namely:

It is difficult to regenerate; high temperatures are required; and in certain cases compounds with high boiling point are irreversibly adsorbed, which results in inactivation of the carbon.

Air cannot be used as the desorption gas, due to the risk of fire in the carbon bed caused by the oxidation of the carbon by the oxygen in the air at those temperatures required for the desorption process. Consequently, desorption is usually effected with the aid of steam or nitrogen gas. The use of steam results in a mixture of solvent and water from the regeneration process, which creates troublesome fractionation problems, primarily in the case of polar solvents. Nitrogen gas is expensive to use, primarily because it is impossible to avoid relatively large nitrogen-gas losses.

Neither can active carbon be used as an adsorption agent in case of high relative air humidities (above about 70%) since the water present will successfully compete against the solvent during the adsorption process.

Furthermore, in certain instances active carbon will catalyse the decomposition of chlorinated hydrocarbons and the polymerization of monomers, e.g. styrene, resulting in inactivation of the adsorbent.

Adsorption processes intended for cleansing solvent-containing air are normally based on solid adsorbent beds in which the solvent is adsorbed during its passage through the bed. The bed is regenerated by shutting-off the ventilation air and shifting to another, parallel bed. A warm desorption gas comprising steam or nitrogen gas is then passed through the bed, therewith desorbing solvent. The mixture of desorption agent and solvent is then passed to a separate cooler for condensation of the solvents. These plants also operate intermittently, necessitating the use of two parallel, continuously operating plants which operate alternately with adsorption and desorption respectively. This results in large and expensive plants, and requires large energy inputs during the desorption process.

A number of drawbacks associated with solid, active carbon-beds have been solved by working with a fluidized bed of carbon particles, in which the carbon particles are regenerated with steam or an inert nitrogen gas in a separate desorption unit. The carbon particles, which comprise specifically selected spherical particles, are transported continuously through the adsorption bed to the desorption unit and back to the adsorption bed. This reduces the amount of energy consumed, compared with solid or stationary beds. Furthermore, the plant is of simpler mechanical construction, since it obviates the alternating re-distribution of air from one bed to another. The primary drawbacks associated with such beds is that it is necessary to operate with relatively thin adsorption beds (25–50 mm) due to the relatively high specific weight of the adsorbents and the relatively slow adsorption kinetics, which means that a relatively large number of beds must be employed in series, in order to achieve a reasonable cleansing effect. Steam or an inert gas, such as nitrogen gas, must also be used for the desorption process in this case. The solvent condensate will contain water, even when nitrogen gas is used, due to the fact that the carbon particles will also adsorb water from the ventilation air in addition to solvent present therein.

SUMMARY OF THE INVENTION

A primary object of the present invention is to provide a method of cleansing gaseous mixtures in which the aforesaid drawbacks are eliminated and which will enable direct recovery to be effected in conjunction with the desorption of several solvent components present in the gaseous mixture, these components also being free from water. This object is achieved through a combination of the choice of adsorbent used and the configuration of the process.

The adsorbent used in accordance with the present invention comprises macroporous polymeric particles of a cross-linked aromatic homopolymer or copolymer having a particle size between 0.1–0.8 mm and a polymeric particle density of 0.4–0.6 kg/dm$^3$. The adsorbent may also contain functional groups in order to impart to the polymeric particles the desired affinity to the solvents concerned in each particular case. The Swedish Patent 8100537-3 describes the use of macroporous polymeric particles in gas and liquid separating processes.

The advantages afforded by the use of macroporous polymeric particles in comparison with conventional adsorbents, such as active carbon, for air purification purposes are primarily that the polymeric particles can be essentially tailored to the use for which they are intended. Thus, such physical parameters as particle size, particle size distribution, pore size, pore size distribution, density and specific surface area can be controlled with the aid of process parameters in the polymerization process. The chemical properties of the adsorbing surface can be controlled through the selection of monomers or by chemical treatment of the polymeric particles.

The present invention is based on the concept that by optimizing the adsorbent it is possible to configure or design a continuous air purifying process which will solve those problems which have previously been unsolvable, or at least very expensive to solve with the aid of conventional techniques.

The most essential properties of the polymeric material for carrying out the continuous process are:

Pore size and pore size distribution. These are critical for the kinetics (rapidity) of both the adsorption and the desorption processes, which are much more critical in a continuous bed than in a stationary or static bed. The pore size distribution shall also be as uniform as possible, although the pore size does have an optimum since excessively large pores will result in a lower specific surface area and therewith in reduced adsorption capacity, whereas excessively small pores will result in an adsorption and desorption rate which is much too slow for a continuous bed to be a suitable alternative.

The polymeric material shall not be oxidized by the oxygen contained in the air at temperatures liable to occur in the process. This will enable air to be used in the desorption process, which is quite unique, and which affords important advantages, not least with respect to the investment and operating costs of the plants.

The polymeric material shall have a density which is adapted for suitable use in fluidized bed processes.

The polymeric material shall have a high mechanical strength so that it will withstand the wear taking place in the fludized bed as a result of movement of the particles. This quality is critical to the length of useful life of the adsorbent.

The hydro-phobicity of the polymeric particles shall be such that absorption of water from the air is negligible. The cleansing effect will thus be independent on the moisture content of the air. Further, it enables the recovery of solvents which are practically free from water.

BRIEF DESCRIPTION OF THE DRAWINGS

FIG. 2 is a schematic cross-sectional view of the fluidized bed variant;

FIG. 3 is a longitudinal sectional view of the arrangement of FIG. 2;

DETAILED DESCRIPTION OF A PREFERRED EMBODIMENT OF THE INVENTION

Figure 1:
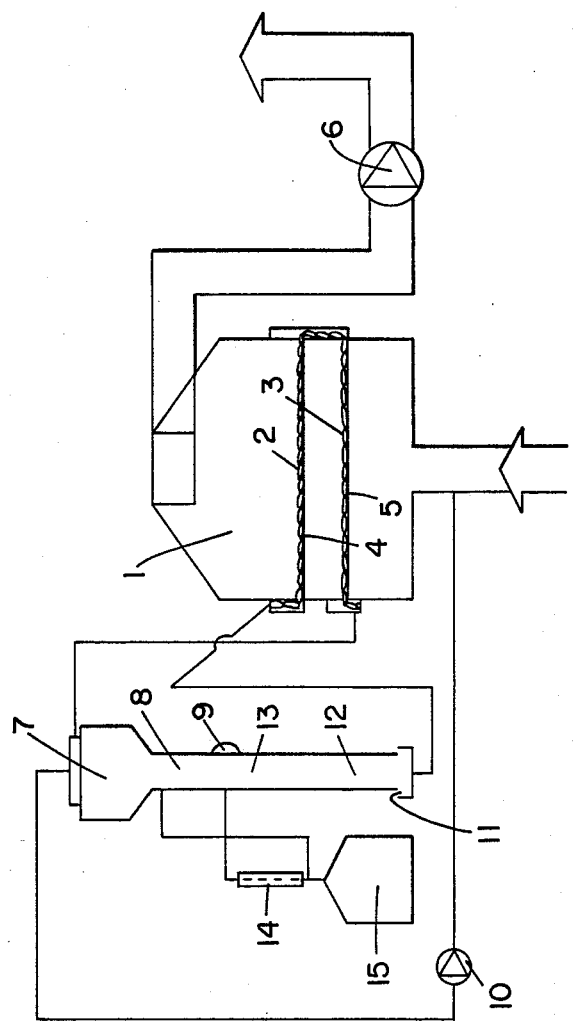
FIG. 1 illustrates a principal flow diagram of the process of the invention.

A principle flow diagram of the inventive process is illustrated in FIG. 1.

The adsorbent, i.e. the macroporous polymeric particles, "floats" through an adsorption unit or column 1 in one or more levels or stages. In the FIG. 1 illustration two such levels, 2 and 3, are indicated, each level incorporating a specially configured fluidizing plate or bottom 4, 5. The air to be cleansed is forced through the adsorption unit 1, by means of a main fan 6. When the main fan 6 is stopped, the process also stops.

The desorption unit comprises a buffer store 7 in which adsorbent is stored above a stripper unit 8, comprising a specially configured heat exchanger (steam heated) provided with gas tapping boxes 9.

When the adsorbent moves through the stripper, it is heated to temperatures at which the solvent can depart from the adsorbent and enter the surrounding stripper air. A region of subpressure is maintained at the top of the buffer store 7 in the container by means of a fan transporter 10. This subpressure is effective in drawing stripper air from an air intake 11 in the bottom of the stripper 8 and causing the air to pass up through the downwardly moving adsorbent. Subsequent to the stripper air having passed through a bottom cooler 12 in the stripper and a heating battery 13, the air passes through a condenser 14, via a withdrawing box or tapping box 9 and back to the stripper 8 above its upper hotter part. The solvent runs from the condensor 14 down into a container 15.

The transport of polymeric material between the desorption and adsorption unit respectively is effected with air, either with the aid of the pressure differentials prevailing in the adsorption and desorption units respectively, or by blowing the adsorbent from one unit to the other.

The flow of adsorbent through the process is controlled by adjusting the flow from the desorber.

The amount of adsorbent in the adsorption unit is adjusted or set with the aid of "level holding plates" at the end of the fluidizing bottoms 4 and 5.

The method of cleansing solvent in accordance with the present invention includes a number of part-inventions each of which is unique and which are made possible by the combination of a tailored adsorbent and solutions for individual process stages, namely:

1. The construction of the fluidized bed in combination with the density of the polymeric material (density=0.4–0.6 kg/dm$^3$) and the particle size (diameter between 0.1 and 0.8 mm) enables relatively thick and compact beds 100–250 mm to be used. In turn, this means that the air to be cleansed need only pass through 1–3 series-connected beds in order to obtain a good cleansing result. The configuration of the fluidized bed is described in more detail hereinafter.

2. Desorption with air and the construction of this system. Because the stripper air is returned to the top of the desorption tower or unit, subsequent to cooling off the solvent, any solvent which remains in the air will be adsorbed by the incoming "cold" adsorbent. The concentration of solvent in the stripper air will therewith increase, resulting in an increase in the cooling off effect in the condenser, until equilibrium is reached. The desorption unit is therefore self-regulating with respect to changes in solvent composition, temperature and water-temperature in the cooler.

3. The desorption unit is constructed so that in the case of solvent mixtures of mutually different boiling point it is possible to take out the solvent in fractions enriched in solvents with high boiling point and low boiling point. This is very important, in many cases, to enable re-use of the solvent without needing to employ a separate fractional destillation process or splitting-up the solvent with the aid of a membrane. This is achieved by dividing the stripper into a number of zones and providing a stripper-air withdrawal facility and a solvent cooling extraction facility downstream of each zone. The technique is based on essentially desorbing solvent with low boiling point in the first zone, by maintaining a relatively low temperature while increasing the temperature in a subsequent zone or zones so as to take out the more high-boiling point fractions. Apparatus intended to this end are described hereinafter.

The main concept behind the "migrating" fluidized bed of the aforesaid kind and its use for cleansing industrial air is thus that the solvent-contaminated air to be cleansed is used for constructing and maintaining the fluidized bed and for feeding the adsorbent through said bed. The adsorbent is then fed from the fluidized bed to a desorption station, in which adsorbed solvent is separated from the adsorbent and recovered by means of a cooling extraction process. The air used to construct the fluidized bed is after having passed through the bed substantially free from solvent.

The difficulties experienced with fluidized beds of the aforesaid kind reside in the ability to feed the particulate adsorbent material through the bed at a uniform, preferably controllable velocity. Bed instability and circular movements therein resulting in uneven residence times cannot be permitted. Thus, it is desired that the adsorbent will pass smoothly and gently through the bed at the rate required to cleanse satisfactorily the air constructing the bed.

This desideratum has been achieved in accordance with the present invention by dividing the fluidized bed into a plurality of mutually parallel zones each being formed above a bar running in the direction of feed through the bed and which has a V-shape or curved (e.g. sinusoidal) cross-section and which is provided along its deepest part with an inlet slot, optionally an adjustable inlet slot, for the air to be cleansed and, at the same time, to construct the fluidized bed.

Figure 4:
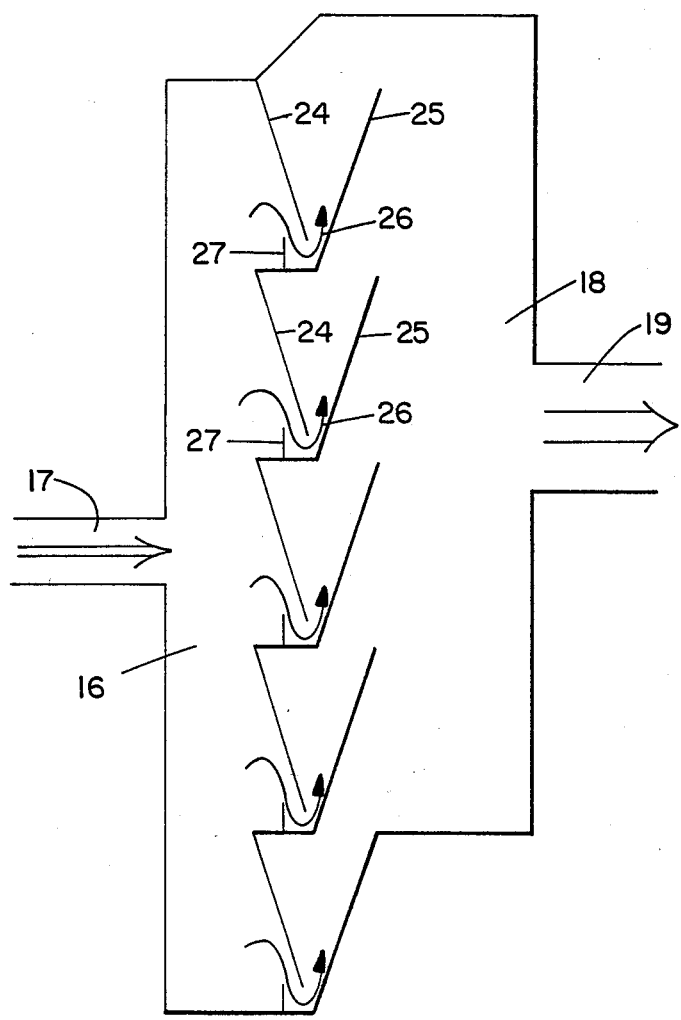
FIG. 4 is a cross-sectional view of a fluidize bed variant in which the zones are arranged one above the other.

FIGS. 3 and 4 illustrate schematically two different variants of the various zones of the inventive fluidized bed, said zones being arranged either side-by-side or one above the other.

FIG. 2 is a schematic cross-sectional view of the fluidized bed variant in which the zones are arranged in horizontal adjacent relationship, whereas FIG. 3 is a longitudinal sectional view of the same arrangement.

FIG. 4 is a cross-sectional view of a fluidized bed variant in which the zones are arranged one above the other.

The arrangement illustrated in FIGS. 2 and 3 includes an inlet chamber 16 provided with an inlet 17 for air to be cleansed, and a fluidizing chamber 18. The fluidizing chamber 18 is provided with an outlet 19 for cleansed air.

The inlet and fluidizing chambers are separated from one another by obliquely extending, mutually angled plates 20, 21 which co-act in pairs to form deep channels, each corresponding to one of the various zones of the fluidized bed. Arranged in the bottom of the channels is a slot 22 through which fluidizing air from the chamber 16 can be fed at a predetermined velocity, the pressure in the chamber 16 thus being maintained at a higher value than the pressure in the fluidizing chamber 18. Means may be provided for adjusting the width of the slot 22.

The manner in which the particulate adsorbent is supplied to the fluidized bed at its inlet side and recovered on its outlet side has not been shown in the drawings. The direction of movement of the absorbent through the chamber is, however, indicated by the arrow A. The air movement is also indicated by means of arrows. The slots 22 are wider than the diameter of the particulate adsorbent. Consequently, particular measures must be taken in order to prevent the adsorbent from falling down into the chamber 16 in the event of a breakdown in operation. Accordingly, in one variant of the invention elongated, angled troughs 23 are arranged beneath respective slots 22. With this arrangement, should a breakdown occur a blockaging plug comprising adsorbent which completely fills the slot 22 and also partially fills the trough 23 will be formed, this plug being blown away from the slot and trough as soon as fresh fluidizing air is supplied to the chamber 16.

It also lies within the concept of the invention to arrange the zones in mutually superposed relationship, in the manner indicated schematically in FIG. 4. The arrangement is illustrated solely in cross-section in this figure.

In the case of the FIG. 4 variant, the zones are formed by mutually inclined plates 24 and 25, the inlet slot being identified by the reference 26 and the protective device against an interruption in the process has been identified by reference 27. The protective device of this embodiment comprises an elongated edge. The air flow past the edge has been indicated in the figure. The inlet chamber 16 and air inlet 17 both have the same function as the inlet chamber and air inlet of the embodiment shown in FIGS. 2 and 3 and are hence identified by the same reference numerals. On the other hand, the fluidized beds of this variant lie completely within the channels formed by respective plates 24 and 25, these channels opening into a common outlet chamber 18 provided with a main outlet 19.

The particular characteristic features of the invention are set forth in the following claims.

Figure 5:
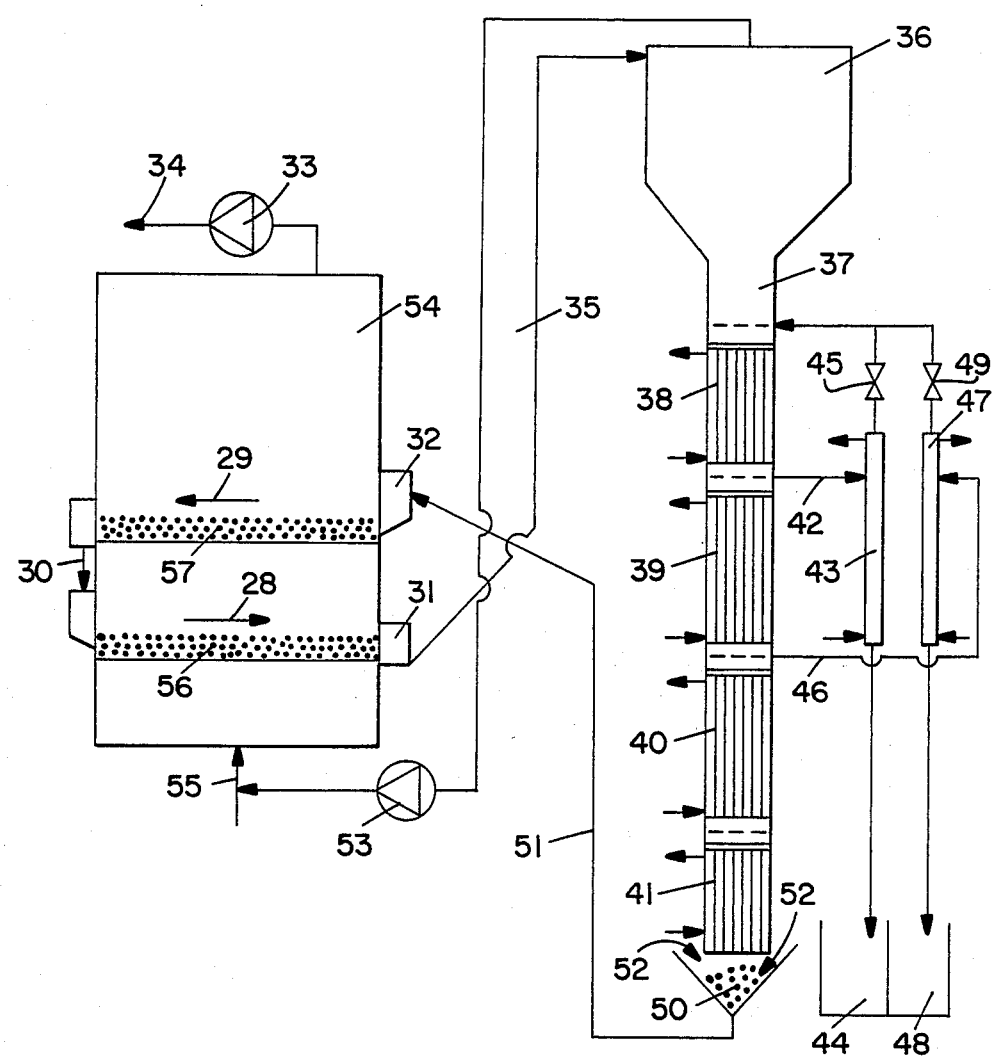
FIG. 5 is an illustration of the apparatus according to the present invention.

The invention will now be described in more detail with reference to an exemplary embodiment of the invention illustrated in FIG 5. This exemplifying embodiment is intended for cleansing air which contains a mixture of two solvents having mutually different boiling points. The example illustrates how fractionation of the solvent in mixture can be effected.

The particular variant of the invention relating to the cleansing of industrial air which contains a mixture of two mutually different solvents with mutually different boiling points will now be described in more detail with reference to the arrangement of apparatus illustrated generally in FIG. 5.

This arrangement includes a vessel 54 into which ventilation air containing two solvents, e.g. air extracted from an automotive vehicle paint plant, is introduced in the direction of the arrow 55. The vessel 54 includes two fluidized beds 56, 57 comprising macroporous, particulate polymeric material functioning as an adsorbent for said solvents. The fluidized polymeric material in the beds can be caused to migrate or wander in the direction of arrows 28 and 29, in a manner known per se, wherewith the material is transferred from the upper bed to the lower bed through a passage 30. Material can be continuously tapped from the lower bed 56 through an outlet 31, this material being regenerated and returned to the upper bed 57, through an inlet 32.

The ventilation air is caused to pass through the vessel 56 under the influence of a subpressure generated by a fan 33. The air delivered through the output 34 of the fan 33 is clean, as a result of passing through the beds 56 and 57.

The adsorbent partially saturated with solvent is fed from the outlet 31, through a conduit 35, to a receiving hopper or buffer store 36, from which material is supplied to a treatment tower 37. The tower 37 is divided into a pre-heating zone 38, two desorption zones 39 and 40, and a cooling zone 41. Each of the zones 38, 39, 40 incorporate a flat heat-exchanger for heating the material entering a respective zone to the intended temperature. The polymeric material is therewith advanced between the flat heat-exchangers, to which desired heating medium is supplied through respective inlets and removed through respective outlets. The cooling zone 41 incorporates a correspondingly constructed cooler.

Subsequent to being pre-heated in the zone 38 to a suitable temperature, the polymeric material is introduced into the first desorption zone 39, in which the material is heated to a temperature sufficient to desorb the solvent having the lowest boiling point. Resultant solvent vapour is passed through a conduit 42 to a condenser arrangement 43, in which the vapour is cooled so as to form a solvent condensate, which is collected in a container 44 and recovered. The coolant inlet and outlet of the condensor are represented by arrows directed in towards and out from the arrangement respectively. Vapour which is not condensed in the condensor 43 is returned, via a constriction 45, to the treatment tower 37 at a location upstream of the pre-heater, so as to again take part in the desorption process. This will guarantee that practically all solvent is recovered and that substantially no solvent will leak to the surroundings.

The polymeric material passes from the zone 39 to the second desorption zone 40, in which the material is further heated to a temperature which will result in desorption of the solvent having the highest boiling point. Similar to the process taking place in stage 39, the solvent vapour produced in zone 40 is passed through a conduit 46 to a condensor 47, in which the vapour is cooled to form a condensate which passes to a vessel 48, from which it is recovered. Non-condensed vapour is returned, via a constriction 49, to the treatment tower at a location upstream of the pre-heater 38, in the manner described with reference to zone 39.

The polymeric material regenerated during its passage through the desorption zones 39 and 40, and cooled in the cooling zone 41, is collected in a container 50 and returned to the inlet 32 of the upper fluidized bed 57, through a condiut 51.

The air required to carry out the process is drawn in at the location where the treatment tower 37 discharges into the container 50, as indicated by arrows 52. The reference 53 designates a pump for returning air leaking from the buffer store 36 to the fluidizing chamber 54. This prevents air from leaking to the surroundings from the desorption plant 36, 37.

As will be evident from the aforegoing, the solvents contaminating ventilation air are fractionated by means of the invention. The inventive process greatly improves the possibilities of re-using the process constituents concerned directly, without the need of separate or individual fractionating processes.

The aforesaid process can be used to particular advantage when, e.g., ventilation air extracted from such a plant as that before mentioned contains both low boiling-point and high boiling-point substances, such as ethylacetate and xylene for example. These substances boil at temperatures of ca. 75° C. and 145° C. respectively and ventilation air containing these substances can be efficiently cleansed in a cleansing plant constructed in accordance with the invention, while enabling the two solvent components to be re-used.

The principles upon which the invention is based have been described in the aforegoing with reference to a schematically illustrated plant. As will be understood by those skilled in this art, the cleansing plant may be modified in several respects without departing from the concept of the invention.

We claim:

1. A method for removing and recovering organic substances, primarily solvents, from contaminated industrial ventilation air from which said organic substances upon passage of the air through a mobile, fluidized bed are adsorbed by a particulate, regeneratable adsorbent whose particle size, pore volume and density are selected with respect to the construction of the fluidized bed, whereas the pore size of said particles, the pore size distribution, the specific surface area and the chemical properties of the surfaces of said particles are selected with respect to the organic substances to be adsorbed by said particles, and in which method the adsorbent, subsequent to contact with industrial ventilation air, is fed further to a stripper in which the adsorbent is regenerated by supplying heat thereto and from which the resultant solvent vapour is passed to a cooler such as to obtain a solvent condensate, which is recovered, said method comprising the steps of:

selecting said adsorbent in the form of a particulate, macroporous polymer and introducing said adsorbent into a cycle flow between the fluidized bed for adsorption of solvent from the industrial ventilation air and said stripper in which the macroporous polymer is desorbed while being passed through the stripper during the successive application of heat;

removing the solvent vapours generated in said stripper together with air which is fed through the stripper in counterflow to the polymer;

withdrawing the resultant solvent-air mixture from the stripper subsequent to having passed one or more mutually different zones within which the macroporous polymer is heated to such an extent as to reach temperatures which correspond to the desorption of solvents of mutually different boiling points;

feeding solvent-air mixture withdrawn from respective zones to a respective cooler in which the solvent vapours are condensed and the solvents recovered while air containing residual solvent vapours are fed back to the stripper at a location at which the absorbent is still cold; and sucking the air supplied to the stripper as a vehicle medium for the solvent vapours in through the stripper outlet through which the polymer particles desorbed in the stripper exit therefrom, said air thereby cooling the polymer particles leaving the stripper ready to be returned to the fluidized bed while, at the same time, progressively heating the air itself.

2. A method according to claim 1, characterized by passing the polymer particles and the air in counterflow between the heated surfaces of a flat heat exchanger, so as to heat the polymer particles and the air in said stripper.

3. A method according to claim 1 or 2 characterized by drawing clean and contaminated air together with the solvent vapours through the fluidized bed and the stripper by suction.

4. Apparatus for removing and recovering organic substances, primarily solvents, from contaminated industrial ventilation air comprising:

an adsorption chamber (54) having at least one fluidized bed (56,57) disposed therein in which the contaminated industrial air to be cleansed is used as a drive medium and is there brought into contact with a particulate, macroporous, polymeric material forming the respective fluidized beds and capable of adsorbing the air-carried solvents concerned, the fluidized bed being constructed so that the polymeric material will pass therethrough transversely of the direction of the contaminated air feed, the adsorption chamber being provided with a clean-air outlet (34) and a polymer-particle outlet (31), this latter outlet (31) being connected to a free-standing stripper unit for desorption of the polymer material, said stripper unit comprising an upper buffer store (36) for the polymeric particles to be desorbed and a plurality of desorption chambers (39,40) arranged sequentially beneath the buffer store and each incorporating a flat heat-exchanger to which a heating medium is separately supplied, and slots arranged between said heat-exchangers for the passage of polymeric material; p1 an air inlet provided downstream of the desorption chambers, said air being drawn through the chambers via a fan (33) connected to the buffer store;

outlets (42,46) respectively located downstream of each individual desorption chamber for tapping-off air mixed with solvent delivered by the polymeric particles, each of said outlets being connected to a respective cooler (43,47) for condensing and recovering solvent;

coolers respectively provided with outlets for returning air to the stripper at a location upstream of said outlets; wherein the stripper is provided downstream of the desorption chambers (39–40) with a cooling chamber (41) for the desorbed polymeric particles and a polymeric-particle outlet which, in turn, is connected to the fluidized beds (56, 57).

5. Apparatus according to claim 4, wherein the stripper air inlet is disposed downstream of the cooling chamber for the desorbed polymeric particles; and wherein the fan which draws air through the stripper is connected on its outlet side with the inlet (25) for introduction of contaminated industrial ventilation air to the fluidized beds.

6. Apparatus according to claim 4, wherein the adsorbent used incorporates said particulate, macroporous polymer having a density of 0.4–0.6 kg/dm$^3$, a particle size of 0.1–0.8 mm, and a porosity between 50 and 70%.

7. Apparatus according to claims 4, 5 or 6, further comprising a first chamber (1,18) into which the contaminated industrial air to be cleansed is caused to flow out through slots (22,26) which widen in the direction of air flow and to form in the chamber a fluidized bed (26,27) from said particulate, macroporous polymeric material which has the ability to adsorb said solvent and which is supplied to the chamber (1,18) and advanced therethrough transversely of the flow direction of said air, the chamber being provided with an outlet (19) for the cleansed air above the fluidized bed, wherein the polymeric-material outlet (31) communicates with a buffer store (7,36) arranged above a desorption chamber (8,38–30) which is provided with heating means and through which the polymeric material is transported gravitationally between heating devices and there meets an upwardly directed air flow and is heated to a suitable solvent-expelling temperature; and wherein the resultant solvent vapour is passed, together with said air, through outlets (9, 42, 46) intended therefor to a cooler (14, 43, 47) in which the solvent is condensed and recovered, said polymeric material being returned to the first chamber via said inlet.

* * * * *